United States Patent [19]

Hashimoto et al.

[11] Patent Number: 4,960,262
[45] Date of Patent: Oct. 2, 1990

[54] BALL VALVE AND METHODS OF FABRICATION

[75] Inventors: Mitsuharu Hashimoto; Shinji Takeda, both of Saitama, Japan

[73] Assignee: Sekisui Kagaku Kogyo Kabushiki Kaisha, Osaka, Japan

[21] Appl. No.: 381,918

[22] Filed: Jul. 18, 1989

Related U.S. Application Data

[60] Division of Ser. No. 830,492, Feb. 19, 1986, Pat. No. 4,883,253, which is a continuation of Ser. No. 561,867, Dec. 16, 1983, abandoned.

[30] Foreign Application Priority Data

Dec. 16, 1982 [JP]  Japan .................. 57-221636

[51] Int. Cl.$^5$ ............................... F16K 5/0
[52] U.S. Cl. .................... 251/315; 137/315
[58] Field of Search ............. 251/315, 514; 137/315; 29/151.1 R

[56] References Cited

U.S. PATENT DOCUMENTS

| | | | |
|---|---|---|---|
| 3,961,770 | 6/1976 | Wrarman | 251/315 |
| 4,038,358 | 7/1977 | Wrassman | 251/315 X |
| 4,257,575 | 3/1981 | Runyon | 251/315 X |

FOREIGN PATENT DOCUMENTS 2829286  1/1980  Fed. Rep. of Germany ...... 251/315

Primary Examiner—John C. Fox
Attorney, Agent, or Firm—Sughrue, Mion, Zinn, Macpeak & Seas

[57] ABSTRACT

A ball valve and a method for fabricating this ball valve wherein a ball seat, formed of a synthetic resin, is mounted at each end of a flow passage in a ball of the valve. A sealing end portion of the ball seat contacts the spherical surface of the ball only in the closed position of the ball. In the open position, the lip falls within a recess surrounding the end of the flow passage in the ball. A gap of 0.3 to 0.7 mm is formed, in the open position, between the wall surface of the recess and the end of the lip. The end of the lip should fall, in the open position of the ball, about 0.2 mm inside an imaginary continuation of the surface of the ball at the recess.

2 Claims, 3 Drawing Sheets

BALL VALVE AND METHODS OF FABRICATION

This is a Division of application Ser. No. 830,492 filed 2/19,/86 U.S. Pat. No. 4,883,263 which is a Continuation of application Ser. No. 561,867 filed 12/16/93 now abandoned

BACKGROUND OF THE INVENTION

The present invention relates to a ball valve in which a ball and ball seats are respectively mounted in and formed in a valve body, and also to a method of fabricating such a ball valve.

A conventional ball valve and method of fabrication thereof are disclosed in U.S. Pat. No. 3,807,692. In this ball valve, recessed surfaces are provided at both surfaces extend inwardly from the spherical surface of the ball. A valve body, which is molded by injection molding, presses the ball seats against the recessed surfaces of the ball. In the closed state of the valve, the ball seats are pressed more strongly against the spherical surface of the ball than in the open state, thereby to obtain a good seal between the ball and the ball seats.

The conventional ball valve described above has ball seats molded such that the ball seats are pressed or deformed against the recessed surfaces of the ball. As a result, the ball seats are acted upon by a deforming force, even in the open state, but with the larger deformation being present in the closed state.

Fluoroplastics, represented by ethylene tetrafluoride which has an excellent resistance to chemical reaction, a high thermal stability and high resistance to wear, have been widely used for ball seats. However, fluoroplastics have a small range of elastic deformation, and therefore the maximum amount of deformation of the ball seats cannot be large. Thus, the maximum amount of pressure acting between the ball and the ball seats is limited in the closed state. Moreover, with this material, the resiliency tends to decrease over a period of time.

If the depth of the recessed surfaces is made large for the purpose of increasing the sealing ability between the ball and the ball seats, an undesirably large torque is required to operate the valve.

Further, during manufacture, there is a large possibility of the ball being misshapen because of the resin pressure which exists when the molten resin is injected into a mold to form the valve body. In such a case, the pressure between the ball and the ball seats on opposite sides of the ball may be different, thereby undesirably causing a loss in sealing ability.

The primary object of the present invention is, in view of the problems in teh conventional ball valve, to provide a ball valve which has good sealing, a high durability and a good performance in operation, and in which, in molding, recessed surfaces of the ball do not contact the lips of ball seats.

SUMMARY OF THE INVENTION

In accordance with the above and other objects of the present invention, there is provided a ball valve and a method for fabricating this ball valve wherein a ball seat, formed of synthetic resin, is mounted at each end of a flow passage in a ball of the valve. A lip of the ball seat contacts the spherical surface of the ball only in the closed position of the ball. In the open position, the lip falls within a recess surrounding the end of the flow passage in the ball. A gap of 0.3 to 0.7 mm is formed, in the open position, between the wall of the recess and the end of the lip. The end of the lip should fall, in the closed position of the ball, about 0.2 mm inside an imaginary extension of the spherical surface of the ball.

DESCRIPTION OF THE PREFERRED EMBODIMENTS

Figure 1:
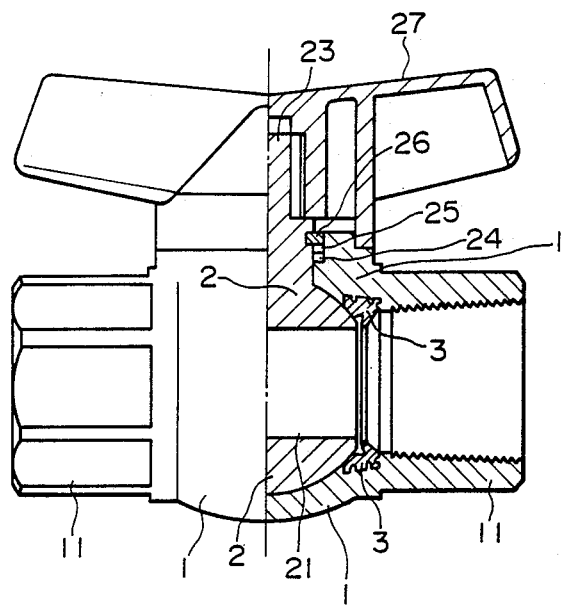
FIG. 1 is a front view of an example of a ball valve of the present invention in the open state.
Figure 2:
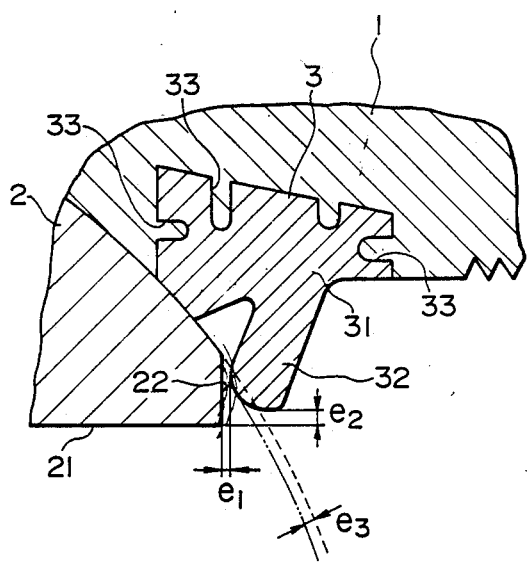
FIG. 2 is an enlarged view of a main portion in FIG. 1.
Figure 3:
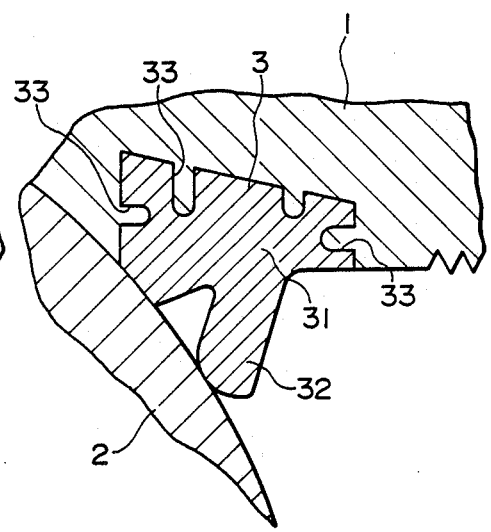
FIG. 3 is an enlarged and sectional view of a main portion of the valve in the closed state.

FIG. 1 is a front view of an example of a ball valve of the present invention, in which the right-hand half is shown in section. FIG. 2 is an enlarged sectional view of a main portion of the valve of FIG. 1. In FIGS. 1 and 2, 1 is a valve body in which a ball 2 having a flow passage 21 and an annular ball seat 3 are received. A shaft 23 is formed integrally with the ball 2; the shaft 23 projects outside the valve body 1. A knob 27 for opening and closing the valve is mounted on the shaft 23. An O-ring 24 used for sealing is mounted by a washer 25 and a stop ring 26 between the shaft 23 and the valve body 1. Threaded connections 11 are provided in the valve body 1 extending coaxial with a center line of the flow passage 21 of the ball 2.

Recesses defined by recessed surfaces 22 are formed at both end portions of the flow passage 21 of the ball 2. A ball seat 3 contacts the spherical surface at each end portion of the ball 2 in such a manner that the ball seat 3 does not contact the recessed surfaces 22 in the position shown. More specifically, the ball seat 3 is composed of an annular body 31, held in the valve body 1, and a lip 32 extending toward the inner portion of the flow passage of the valve body 1 from the annular body 31. When the flow passage 21 of the ball 2 is coincident with the flow passage of the valve body 1 (fully open position), the lip 32 does not contact the corresponding recessed surface 22 of the ball 2, and when the flow passage is closed by a rotation of the ball 2, the lip 32 is in close contact with the spherical surface of the ball 2. To this end, it is necessary that the inner annular portion of the sealing portion 32 confront the notched portion 22 of the ball 2 and be positioned, in the open position of the ball, inside of an imaginary extension of the spherical surface of the ball 2. In order to achieve a sufficient seal between the inner annular portion of the lip 32 and the spherical surface of the ball 2 at the closed position of the ball, it is preferable to place the inner annular portion of the lip 32 inside the imaginary extension of the spherical surface of the ball 2 by at least 0.2 mm (dimension $e_3$ in FIG. 2). Further, it is preferable to form the curved surface of the inner annular portion such that the frictional resistance is small when contacting the recessed surface 22 of the ball 2.

Further, the lip 32 is deformed in the direction opposite the ball 2 upon contact with the spherical surface of the ball 2 when the valve is closed. The operation of opening and closing the ball valve is made easy by making small the frictional resistance due to this deformation. Also it is preferred to provide the lip 32 with an inclination to the recessed surface 22 of the ball 2. A suitable inclination angle is within the range of 50 to 70 degrees to the axis of the flow passage. In case of the angle being below 50 degrees, when the recessed surface 22 of the ball 2 contacts the lip 32 from the center side of the flow passage, the frictional resistance is undesirably increased by the active force pinching the lip 32.

As shown and described, the recess defined by the recessed surface 22 of the ball 2 is cut from the spherical surface of the ball 2 so as not to contact to the lip 32 of the ball seat 3. It is preferable to provide a gap of 0.3 to 0.7 mm (dimension $e_1$ in FIG. 2) between the recessed surface 22 and the lip 32 inside the imaginary extension of the spherical surface of the ball 2. The reason why the above gap range is suitable is that, in the case where the ball 2 is moved from its open state to its closed state, after the ball 2 has initially started moving, the initial static frictional resistance becomes a dynamic frictional resistance, thereby reducing the momentary frictional resistance. By adding the frictional resistance force between the spherical surface of the ball and the ball seat 3 to the dynamic frictional force, it is possible to smoothly move the ball 2 to close the ball valve with a small torque. The juncture between the recessed surface 22 and the spherical surface of the ball 2 should be smooth. Further, the annular body 31 of the ball seat 3 is disposed in the valve body 1 in such a manner that a portion of the annular body 31 is in contact with the spherical surface of the ball 2.

Figure 4:
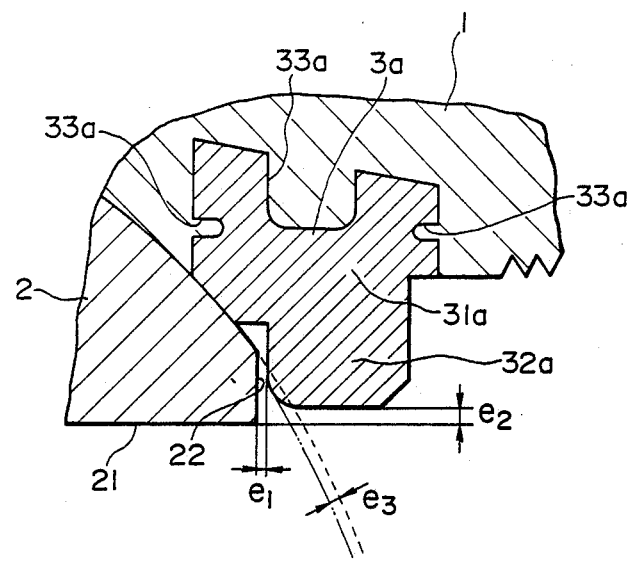
FIGS. 4 and 5 are views similar to FIG. 2 showing alternate embodiments of a ball seat.

Moreover, in accordance with the present invention, if the width of the lip 32 of the ball seat 3 is increased, the force of the lip 32 pressing against the spherical surface face of the ball 2 is also increased, thereby improving the sealing effect, although the torque required for turning the knob of the ball valve is somewhat increased. An example of such a ball valve is shown in FIG. 4. In FIG. 4, reference numerals 3a, 31a, 32a, and 33a designate a ball seat, an annular body, a lip, and grooves provided on the outer periphery and side surface, respectively.

The ball of the present invention may be made of metal, of more preferably, of a synthetic resin such as rigid polyvinylchloride, polypropylene, polyamide, or ABS. Especially it is preferred to use chlorinated polyvinylchloride, which has a high thermal stability. It is further preferred to add to the resin flake-like graphite particles in an amount of 2 to 20 parts by weight in order to improve the molding and cutting performance of the chlorinated polyvinylchloride.

The valve body is made of synthetic resin suitable for injection molding. The ball seat is made of a synthetic resin capable of elastic deformation, such as fluoroplastics polyamideresin and syhthetic rubber. It is particularly preferable to use ethylene-tetrafluoride, known under the tradename Teflon, which has a high thermal stability and wear resistance.

Figure 6:
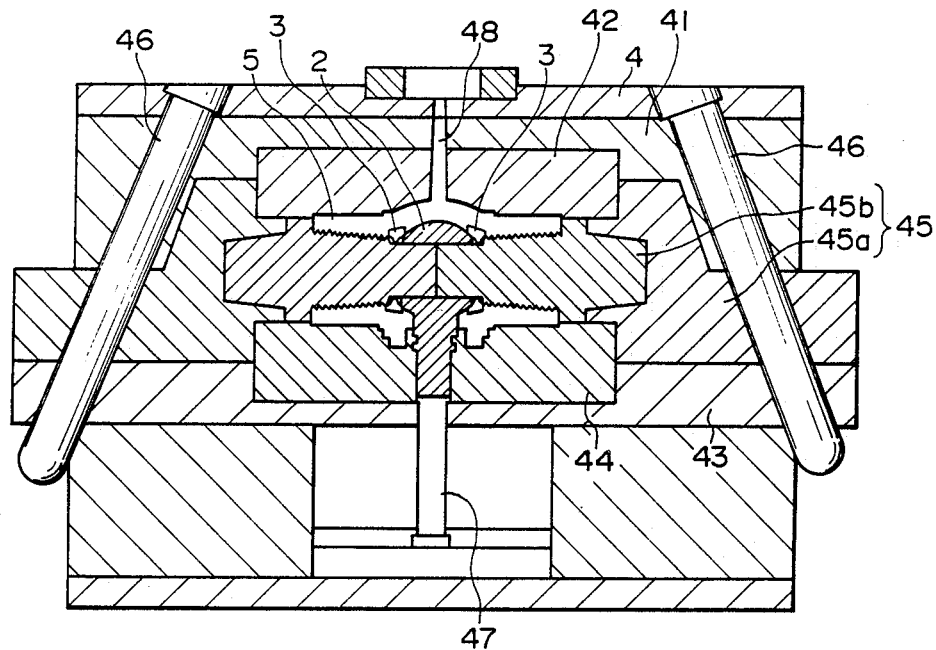
FIG. 6 is a sectional view of an example of a molding die used to fabricate a valve of the present invention.
Figure 7:
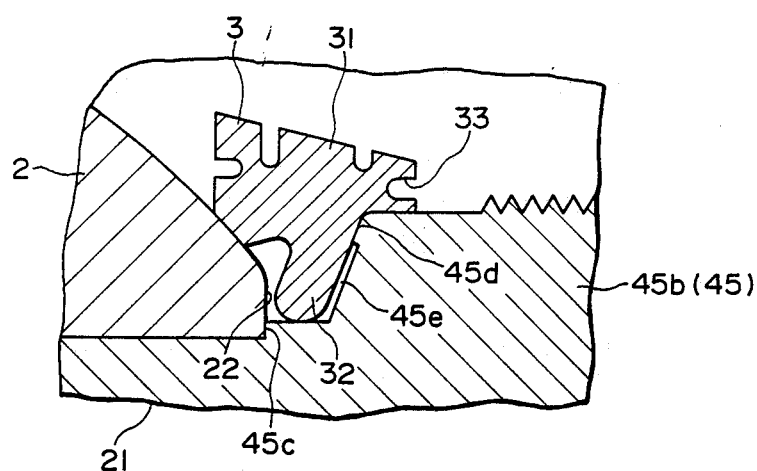
FIG. 7 is an enlarged and sectional view of a main portion in FIG. 6.

Referring next to FIGS. 6 and 7, a method of making the ball valve of the present invention will be explained. FIG. 6 is a sectional view of an example of a molding die, and FIG. 7 is an enlarged view of a main portion of the molding die shown in FIG. 6. The molding die 4 is composed of a fixed outer die 42, attached to a fixed plate 41, and a movable outer die 44, attached to a movable platen 43. The slidable cores 45 are composed of core bodies 45a which are fitted with tapered pins 46 so that they can slide in the lateral direction, and of fixed pieces 45b fitted to the core body. Reference numerals 47 and 48 designate an ejector pin and sprue, respectively.

In molding the valve body, in the open state of the molding die, the ball 2 is mounted in the die with its shaft disposed in the recess portion of the movable die 44, and the fixed pieces 45b are fitted to the core bodies 45a. Each fixed piece 45b is composed of an offset portion 45c at the periphery of the end point portion and a seat holding portion 45d. The ball seat 3 is fitted and held to the seat holding portion 45d, before the fixed piece 45b is fitted to the core body 45a, as shown in FIG. 7.

The seat holding portion 45d has a diameter so as to be closely fitted to the annular body 31 of the ball seat 3. The offset portion of the seat holding portion 45d supports the ball seat 3 by contacting the lip 32 of the ball seat 3 with the offset portion.

The end point portion of the fixed piece 45b is fitted to the flow passage 21 of the ball 2, and both sides of the recessed surface 22 of the ball 2 are pinched by the offset portions 45c to place the ball 2 at a predetermined position. The offset portion 45c is used for pinching the ball 2. The width $e_2$ (FIG. 2) should be about 0.5 to 2 mm.

Then, in the closed state of the molding die 4, the ball 2 is held in the predetermined position by pinching due to the fitting of the end point portion of the fixed piece 45b of the slide core 45 and the offset portion 45c. The ball seat 3, held on the seat holding portion 45d of the fixed piece 45b, is held because the annular body 31 is in contact with the spherical surface of the ball at the periphery of the recessed surface 22 at both sides of the flow passage 21 of the ball 2, as shown in FIG. 6.

The seat holding portion 45d of the fixed piece 45b is formed in the shape described above in order to avoid the lip 32 of the ball seat 3 being pressed against the recessed surface 22 of the ball 2 or the spherical surface of the ball 2. Further, it is preferable that the inner diameter of the annular body 31 at the ball side be smaller than that of the side held by the seat holding portion 45d. By doing this, the portion of the annular body 31 having a small diameter is pressed between the seat holding portion 45d and the spherical surface of the ball 2. Therefore, it is less prone to press the end point portion of the lip 32 toward the recessed surface 22 of the ball 2.

Particularly, it is preferable to provide a gap 45e between the seat holding portion 45d and the end point portion of the lip 32 of the ball seat 3.

In the closed state of the molding die 4, the movable side outer die 44 engages the fixed outer die 42 to form the cavity 5 for forming the valve body between the dies and the slide cores 45, the ball 2, and the ball seats 3. Then, molten resin is injected and filled into the cavity 5, thereby to form the valve body 1. After the resin is set, the molding die 4 is opened to open the outer dies 42 and 44, and then the slide core body 45a is pulled along the obliquely extending pin 46. The fixed piece 45b is retained in the state where it is fitted to the valve body 1 because it is fixed to the valve body 1 by a threaded portion. After the opening of the molding die 4, the ball valve fitted with the fixed piece is removed from the molding die 4 by pushing the ejector pin 47. The fixed piece 45b may be repeatedly used.

In the above mentioned example, a screw connection 11 is provided, but a slide-on connection can be formed by replacing the slide core 45 with a member capable of sliding movement along the pin 46. In that case, while the molding die is being opened, the slide core may be pulled out from the molded ball valve.

In the ball valve thus formed, if there are provided grooves 33 at the outer periphery of the annular body 31 of the ball seat 3 and the side surface thereof in the peripheral direction, the molten resin will penetrate into the grooves 33, and therefore the contact surface between the valve body 1 and the ball seat 3 will have a long wavy form, thereby effecting a very tight seal. Further, pulling the ball seat 3 out from the valve body 1 upon the operation of the ball is also thereby avoided. The grooves may have a width of 0.2 to 0.5 mm and a depth of 0.5 to 1.5 mm.

Figure 5:
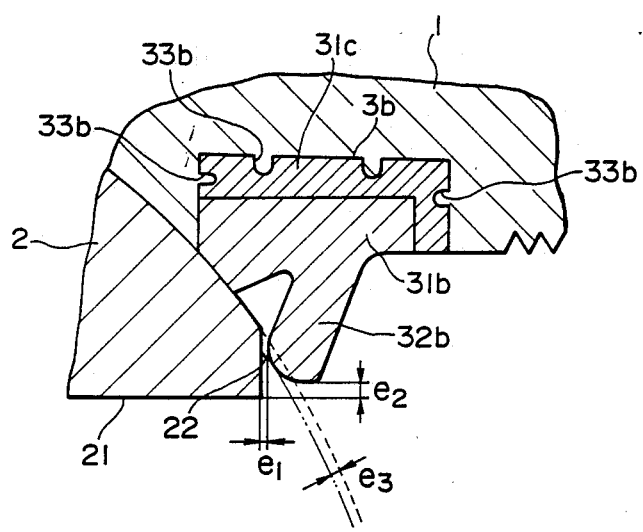

In the case of using ethylene-tetrafluoride for the ball seat 3, because mold forming is not suitable for this material, the ball seat 3 is usually cut from a cylindrical rod or a tube by using a lathe or the like. However, this increases the cost of the valve, especially in the case where the member has a complex shape. Instead of attempting to cut the ball seat 3 in a complex shape, an elastic layer 31c of thermally stable but moldable material can be provided on the peripheral portion of the annular body 31b of the ball seat 3b as shown in FIG. 5. The elastic layer 31c is pressed against the peripheral portion of the ball seat 3b, thereby to provide a good seal. The elastic layer 31c may be made of silicone rubber, polyfluorocarbon rubber or the like having a thermal stability required for the temperature of the molding process of the valve body 1. Such rubber materials are suitable for molding, so that it is easily possible to form even a complex shape with a molding process. In the case of using the elastic layer 31c, sealing is provided by a restoration force due to the rubber-like elastic body 31c. Therefore, it is not always necessary to provide the grooves 33b.

Moreover, by providing the ball seat with an outwardly slanting surface as shown in FIG. 7, when molten resin is injected during the molding process, the ball seat will be urged toward the ball, thereby further insuring good sealing between the ball seat and ball.

With the ball valve of the present invention constructed as described above, the ball seat is in close contact with the spherical surface of the ball but not in contact with the recessed surface of the ball. Thus, because no deformation force affects the ball seat in the open valve state, it can be appreciated that fluoroplastics provide a good sealing effect because of their other excellent characteristics even though such materials may have a narrow range of elastic deformation. Further, the amount of deformation acting on the ball seat is small, and the deformation is present only when the valve is close, thus provide an excellent durability. Still further, it is possible to smoothly operate the knob to open and close the valve since the spherical surface of the ball is pressed against the ball seat with a small pressure.

During the molding of the valve body, the ball is directly held by the slide core, so that the ball is held at the correct position with a high precision. The ball held at the correct position is pressed away from the ball seat by means of the slide core holding the ball so that the pressure acting between the ball and the ball seat at both sides are the same, thereby resulting in a ball valve with an excellent sealing characteristic.

We claim:

1. A method for fabricating a ball valve, comprising the steps of: inserting a ball and attached shaft into a pair of slide cores having portions extending into a flow passage in said ball; disposing a ball seat at positions surrounding each end of said flow passage in said ball, each said ball seat comprising an annular body which is provided with a plurality of grooves formed in an outer peripheral portion and side portions thereof; disposing an outer die around said pair of slide cores having a cavity therein dimensioned for forming a valve body, each said slide core having a seat holding portion for urging said ball seat toward said ball; and injecting molten resin into a cavity between said outer die and said slide cores, and into said grooves, wherein each said ball seat has an annularly shaped lip extending toward said ball, and wherein a gap is formed between a surface of said lip facing away from said ball and an adjacent surface of each said slide core located radially inwardly of said seat holding portion.

2. A method for fabricating a ball valve, comprising the steps of: inserting a ball and attached shaft into a pair of slide cores having portions extending into a flow passage in said ball; disposing a ball seat at positions surrounding each end of said flow passage in said ball; disposing an outer die around said pair of slide cores having a cavity therein dimensioned for forming a valve body, each said slide core having a seat holding portion for urging said ball seat toward said ball; and injecting molten resin into a cavity between said outer die and said slide cores, wherein each said ball seat has an annularly shaped lip extending toward said ball, and wherein a gap is formed between a surface of said lip facing away from said ball and an adjacent surface of said slide core located radially inwardly of said seat holding portion.

* * * * *